Nov. 16, 1948.   L. BROWN ET AL   2,453,966
DOUBLE ACTING SHOCK ABSORBER
Filed Aug. 23, 1946   2 Sheets-Sheet 1
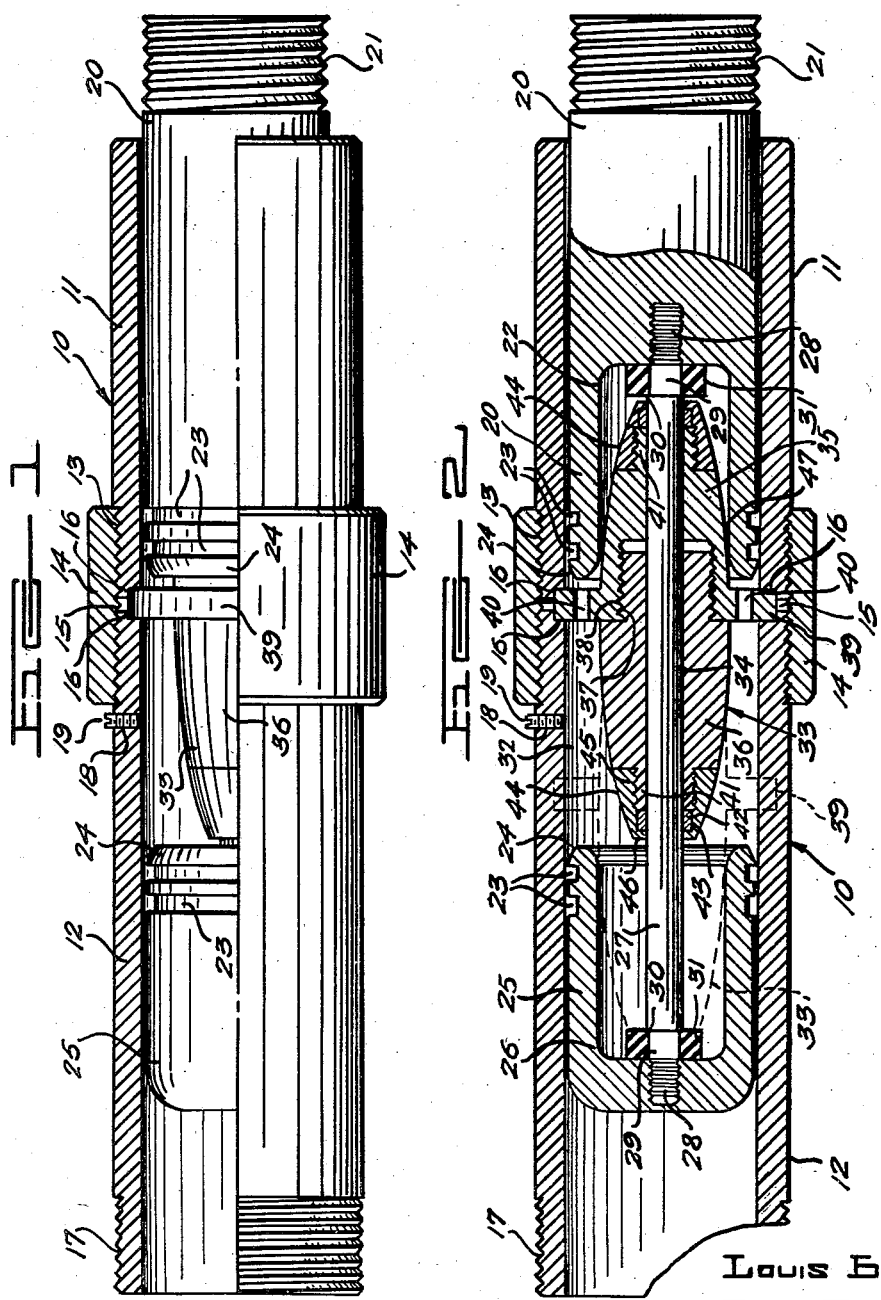
Inventor
Louis Brown
Leo Lacey
By Clarence A. O'Brien
and Harvey B. Jacobson
Attorneys

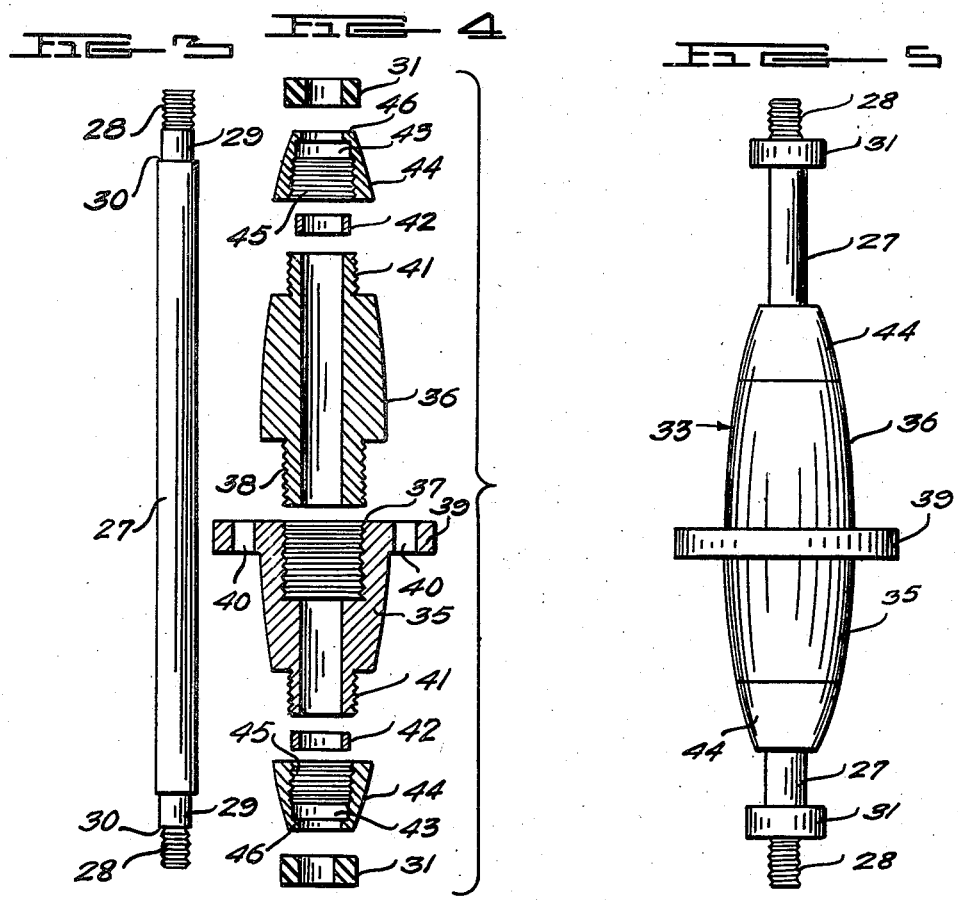

Patented Nov. 16, 1948

2,453,966

UNITED STATES PATENT OFFICE 2,453,966

DOUBLE-ACTING SHOCK ABSORBER

Louis Brown and Leo Lacey, Uvalde, Tex.

Application August 23, 1946, Serial No. 692,516

7 Claims. (Cl. 188—88)

1

This invention relates to shock absorbers and more particularly to a double acting shock absorber, adapted to be connected to two bodies to check and restrict as well as cushion the movements thereof in opposite directions by the displacement of fluid or liquid between two chambers, thereby reducing or eliminating jar and shock between the bodies moving in opposite directions relatively toward or away from each other.

It is an object of the invention to provide a novel shock absorber which will act in opposite directions, or in other words a double acting shock absorber by which two connected plungers operating in a cylinder and each having a fluid or liquid containing chamber communicating with each other through passageways or openings, are so connected and related to each other as to operate over the opposite ends of an oppositely tapered pin or body held stationary in the cylinder so that said passages are gradually restricted toward opposite limits or movements of the respective bodies and plungers to effectively cushion the movements thereof.

Another object of the invention is to provide a novel and simple construction of bevel acting shock absorber which is strong and durable and will effectively reduce hydraulic cushions to absorb shock in either direction.

Other objects and advantages reside in the details of construction and operation as more fully hereinafter described and claimed, reference being had to the accompanying drawings forming part hereof, wherein like numerals refer to like parts throughout, and in which:

Figure 1 is a sectional elevation of a double acting shock absorber constructed in accordance with the invention;

Figure 2 is a central longitudinal sectional view thereof;

Figure 3 is an elevation of a shaft for connecting the oppositely movable plungers of the shock absorber;

Figure 4 is a sectional view showing the parts of the cushioning pin or body exploded or disassembled;

Figure 5 is an elevation showing the parts illustrated in Figures 3 and 4 in assembled relation, and Figure 6 is a sectional elevation showing the fluid escape openings through the flange of the tapered pin.

Referring to the drawings in detail, in which like reference characters designate corresponding parts throughout the several views, the double acting shock absorber is shown as comprising a cylinder 10 made up of two sections 11 and 12 of tubular form externally threaded at their adjacent inner ends as indicated at 13, to take an interiorly threaded coupling sleeve 14, by which the aligned sections 11 and 12 of the cylinder are connected in spaced relation as indicated at 15 and provided with adjacent interior annular recesses 16. The outer end of the section 12 is also externally threaded as indicated at 17, for connection with one element or body to be cushioned. Fluid, may be disposed within the cylinder or chambers of the cylinder through a hole 18 therein at the section 12, in the form of a threaded bore closed by a threaded plug 19. The outer end of the section 11 is unthreaded, both ends of the cylinder and the sections 11 and 12 being freely open and unobstructed. A plunger 20 is disposed in the cylinder at one end within the section 11 and is externally threaded or otherwise formed as at 21, for attachment to the other element or body to be cushioned.

The inner end of the plunger 20 is hollowed out to form a chamber 22 open at its inner end and externally grooved as indicated at 23 to take the fluid or suitable packing within the bore of the cylinder and said end is tapered as indicated at 24. A second plunger 25 is fitted in the section 12 of the cylinder and is hollowed out as indicated at 26 to form a chamber therein also open at its inner end and grooved and tapered the same as the plunger 20 as also indicated at 23 and 24. The plungers 20 and 25, are connected in spaced relation through the medium of an axial rod or shaft 27 shown having threaded ends 28 engaged in threaded sockets in the end walls of the plungers 20 and 25. The adjacent end portions of the rod or shaft 27 are also provided with reduced portions 29 forming shoulders 30 facing outwardly, to take rubber or like cushioning washers 31 on the reduced portions 29 against the shoulders 30 and the end walls of the chambers 22 and 26 of the plungers 20 and 25 respectively.

A chamber 32 is formed between the plungers 20 and 25 respectively and adapted to receive therein in addition to the fluid or liquid such as oil or water, a shock absorbing control means consisting of an oppositely tapered axial pin or body 33 and having a longitudinal axial bore 34 slidably mounting the same on the rod or shaft 27 and shorter than said shaft between the end walls of the chambers 22 and 26 of the plungers 20 and 25, so as to move into and out of the same in opposite directions, one at a time. The pin or body 33 comprises two sections 35 and 36, the former of which has a threaded counter-bore 37 in which a reduced externally threaded inner end 38 of the section 36 is engaged to connect the sections adjustably and permit adjustment of the length of the pin or body. The section 35 is also provided with an annular flange 39 at its inner end, which fits in the annular recesses 16 at the inner ends of the cylinder sections 11 and 12, so as to be held stationary therein, the flange 39 having a plurality of spaced openings or concentric arcuate slots or passages 40 therethrough arranged in annular series, as shown in Figures 2, 4 and 6. The ends of the sections 35 and 36 are provided with reduced externally threaded portions 41 to receive an annular packing or bushing 42 against the ends thereof, to fit in annular recesses 43 of nuts 44 internally threaded as indicated at 45, to engage the threads 41 so that the fluid will not pass between the bore 34 and the shaft 27, while permitting the pin and cylinder to freely move back and forth on the shaft. The flanged ends 46 of the nuts 44, outwardly of the bushings or packings 42 at the recesses 43, are designed to strike the cushioning or rubber washers 31 at opposite ends of the movements of the pin 33 with the cylinder 10 or of the connected plungers 20 and 25 to cushion the movements of the plungers 20 and 25 against the end walls of the chambers 22 and 26. In the opposite movements of the plungers or cylinder relatively, the pin 33 entering the chambers 22 and 26 will alternately form narrow tapered channels or passageways 47 between the periphery of the pin or its sections 35 and 36 upon opposite sides of the flange 39, at the open inner ends 24 of the plungers tending to restrict the flow of the fluid or liquid into and out of the chambers 22 and 26 at such points and form hydraulic cushions, designed to cushion the movements of the bodies or elements in opposite directions and form a double acting shock absorber by checking the movements in opposite directions, with an effective cushion of graduating form, so as to effectively absorb shocks.

Thus, it will be seen that the double acting shock absorber is a device that cushions jar or sudden movement and may be used on railway coaches and boxcars, to cushion the jar by connection between the same, or used in various other ways, such as a connection to a power shaft having vertical or horizontal motions, so as to change the distance of travel of the shaft. By proper adjustment, as described, any desired travel at one end of the shaft may be determined while the travel of the shaft at the other end has not been altered and remains the same. Although the device is double acting, it is free in its movements, and will transmit the power or load from the shaft to the changed stroke in an even and uniform manner at the part to which it is connected. The travel will be determined by the length of the shaft 27 and the degree of movement allowed thereon through the oppositely tapered body or pin, or of the pin and cylinder with respect to the shaft by displacing the fluid in the chamber 32 in opposite directions to and from the chambers 22 and 26 through the passages or openings 40, and the narrow graduating or tapered annular passages 47 between the pin and the annular walls of the chambers 22 and 26 and from one chamber to the other as described, owing to the connection of the plungers to opposite ends of the shaft and parts which are relatively movable and to be cushioned, being connected to opposite ends of the cylinder 10 and plunger 20, respectively. Also, all of the working parts will be retained in the cylinder 10 and movable in the sections 11 and 12 thereof, so as to be protected thereby. By connecting the plunger 20 and the opposite end of the cylinder 10 to the relatively movable elements or objects, either one or both of which may be designed for movement, in order to effectively provide a double acting shock absorber and cushion for the movements of one or both, and owing to the tapered body or pin 33 being held against movement relative to the cylinder, assuming that the plunger 20 and cylinder 10 are connected to the movable parts, the plungers 20 and 25 connected by the shaft 27, in moving in opposite directions, will cause the tapered pin 33 to enter ultimately into the chambers 22 or 26, or move out of the same, the fluid or liquid will be displaced in opposite directions from the respective chambers through the openings 40 and the passages 47, between the oppositely tapered ends of the pin 33 and said chambers, to gradually and increasingly restrict the same, to cushion the respective movements, as well as providing hydraulic cushions within the chambers as the passages 47 are increasingly restricted in the movements of the parts in opposite directions to effectively absorb shock in either direction. Thus, certain movements of the elements or bodies connected to the plunger 20 and the opposite end of the cylinder 10, will cause opposite movements of the plungers or cylinder with respect to the tapered body or pin 33, forcing the fluid or liquid from the ends of the chamber 32 or the respective chambers 22 and 26, toward the opposite end or from the chamber 22 to the chamber 26 and vice versa, to effectively absorb shock and vibration. This is due to the constant, uniform and gradual closing or reducing of the cross sectional areas of the passages 47 between the inner walls of the chambers 22 and 26 at the ends 24 and the peripheral surface of the pin 33, and the partial trapping of the fluid in the respective chambers 22 and 26, so as to increase the pressure therein until the pressure equals the force of movement of the body connected to the plunger or cylinder. This action therefore governs the sudden movement of the respective bodies in a delayed and uniform manner and when the ends of the pin reach the ends of the chambers 22 and 26, the movement thereof will be further cushioned and checked against the cushion or rubber washers 31 and by the substantial closing of the passages 47.

While in the foregoing there has been shown and described the preferred embodiment of this invention it is to be understood that minor changes in the details of construction, combination and arrangement of parts may be resorted to without departing from the spirit and scope of the invention as claimed.

What we claim as our invention is:

1. In a double acting shock absorber, an open ended cylinder, axially connected plungers having interior chambers opening inwardly operating therein in spaced relation, and an oppositely tapered axial body held in the cylinder in spaced relation to the bore of the cylinder and through which the connection of the plungers has a sliding fit and is designed to move or over which connection the body is adapted to move with the cylinder, to displace the fluid in the cylinder between the same and the body and to and from the chambers of the plungers around the outside of the body.

2. In a double acting shock absorber, an open ended cylinder, connected hollow plungers having interior chambers open at their inner ends operating therein in spaced relation, an oppositely tapered axial body held peripherally in the cylinder in spaced relation to the bore of the cylinder to provide passages therebetween and through the axial center of which the connection of the plungers has interfitting engagement and is designed to move or over which the body is adapted to move with the cylinder, to displace the fluid in the cylinder and chambers of the plungers, the plungers forming passageways of gradually reduced cross sectional areas with the tapered body upon opposite movement thereof to form hydraulic cushions within the chambers upon movements of the plungers over said body.

3. In a double acting shock absorber, an open ended cylinder, connected hollow plungers operating therein in spaced relation, said plungers having interior chambers open at their inner ends and closed at their outer ends, an oppositely tapered body connected peripherally with and held against movement in the cylinder with openings through the connection and through which the connection of the plungers has a sliding fit and is designed to move or over which the body is adapted to move with the cylinder, to displace the fluid in the cylinder and chambers of the plungers, there being passageways through the peripheral connection of the tapered body with the cylinder forming a chamber between the plungers, opposite movements of the plungers relative to the body forming passageways of gradually enlarging or decreasing cross sectional areas between the body and the chamber walls of the plungers and between the body and bore of the cylinder upon opposite sides of the peripheral connection of the body with the cylinder.

4. In a double acting shock absorber, an open ended cylinder, connected plungers operating therein in spaced relation, an oppositely tapered axial body held in and connected to the cylinder and through which the connection of the plungers is designed to move or over which the body is adapted to move with the cylinder, to displace the fluid in the cylinder and chambers of the plungers, there being passageways through the connection of the tapered body with the cylinder forming a chamber between the plungers, opposite movements of the plungers relative to the body forming annular passageways of gradually enlarging or decreasing cross sectional areas between the body and the chamber walls of the plungers in moving in opposite directions, and cushioning elements between the end walls of the plunger chambers and the ends of the oppositely tapered body, to additionally cushion the movements of the two relatively at the ends of said movements.

5. In a double acting shock absorber, an open ended cylinder, connected plungers operating therein in spaced relation, an oppositely tapered axial body held in and connected to the cylinder and through which the connection of the plungers is designed to move or over which the body is adapted to move with the cylinder, to displace the fluid in the cylinder and chambers of the plungers, and cushioning members on the connection between the plungers to cushion the movements of said plungers, at the ends of said movements.

6. A double acting shock absorber comprising an open ended cylinder comprising connected sections, an oppositely tapered body comprising connected sections having a peripheral flange held between the sections of the cylinder in annularly spaced relation to the bore of the cylinder, said flange having openings therethrough, oppositely movable plungers in the cylinder, a rod connecting the plungers in spaced relation axially and passing through a bore in said oppositely tapered body with a sliding fit, one end of the cylinder and one end of one plunger being designed for connection to elements or bodies to be cushioned in their movements, said plungers having interior chambers open at their inner ends and closed at their outer ends adapted to form passageways of gradually reduced cross sectional areas between the same and the periphery of the body in movements of the plungers or body in opposite directions to displace the fluid in the cylinder in opposite directions into the respective chambers from the opposite chambers, and means for supplying fluid to said chambers.

7. A double acting shock absorber comprising an open ended cylinder comprising connected sections, an oppositely tapered body comprising connected sections having a peripheral flange held between the sections of the cylinder and having openings therethrough, oppositely movable plungers in the cylinder, a rod connecting the plungers in spaced relation and passing through a bore in said oppositely tapered body, one end of the cylinder and one end of one plunger being designed for connection to elements or bodies to be cushioned in their movements, said plungers having chambers adapted to form passageways of gradually reduced cross sectional area between the same and the body in movements of the plungers or cylinder in opposite directions to displace the fluid in the cylinder in opposite directions into the respective chambers from the opposite chambers, and means for cushioning the movements of the plungers against the ends of the body.

LOUIS BROWN.
LEO LACEY.

REFERENCES CITED

The following references are of record in the file of this patent:

UNITED STATES PATENTS

| Number | Name | Date |
| --- | --- | --- |
| 1,273,059 | Hild | July 16, 1918 |
| 1,972,403 | Kilgore | Sept. 4, 1934 |
| 1,993,703 | Clifford | Mar. 5, 1935 |
| 2,029,829 | Messier | Feb. 4, 1936 |